United States Patent
Bautista et al.

[11] Patent Number: 6,045,846
[45] Date of Patent: Apr. 4, 2000

[54] PRODUCE STERILIZATION

[75] Inventors: James M. Bautista; Omar Houry, both of King City; Dave A. Mirko, Lockwood; Gary N. Schabel, King City, all of Calif.

[73] Assignee: Dionex Corporation, Sunnyvale, Calif.

[21] Appl. No.: 09/216,084

[22] Filed: Dec. 18, 1998

[51] Int. Cl.⁷ .............................. A23B 7/157; A23L 3/358
[52] U.S. Cl. .................... 426/335; 426/321; 426/532; 426/442; 422/33
[58] Field of Search ...................... 426/321, 331, 426/333, 335, 532, 539, 442, 506, 281; 422/1, 28, 32, 33

[56] References Cited

U.S. PATENT DOCUMENTS

| | | | |
|---|---|---|---|
| 349,852 | 9/1886 | Marchand | 426/332 |
| 2,615,813 | 10/1952 | Malter et al. | 99/140 |
| 2,655,449 | 10/1953 | Almquist | 99/113 |
| 2,777,749 | 1/1957 | Young | 8/104 |
| 3,151,985 | 10/1964 | Fobes | 99/77 |
| 3,308,113 | 3/1967 | Johnsen et al. | 260/118 |
| 3,607,293 | 9/1971 | Furukawa et al. | 99/1 |
| 4,180,592 | 12/1979 | Buckley et al. | 426/32 |
| 4,919,952 | 4/1990 | Sadaranganey et al. | 426/254 |
| 5,069,919 | 12/1991 | Weibel | 426/261 |
| 5,085,880 | 2/1992 | Devic | 426/253 |
| 5,352,467 | 10/1994 | Mitchell et al. | 426/316 |
| 5,403,602 | 4/1995 | Endico | 426/231 |
| 5,480,788 | 1/1996 | Devic | 435/168 |
| 5,599,571 | 2/1997 | Estrada | 426/321 |

OTHER PUBLICATIONS

Marchuk, L.I., et al, "Preservation of Intermediate Vegetable Products by Using Hydrogen Peroxide," Ukrainian Scientific Research Institute of the Canning Industry, UDC 664.843.5=664.8.03., 1998.

Sapers, G.M., et al, "Effects of Hydrogen Peroxide Treatment on Fresh–Cut Fruits and Vegetable," IFT Annual Meeting: Book of Abstracts, 272:91–8 (1995).

*Primary Examiner*—Keith D. Hendricks
*Attorney, Agent, or Firm*—David J. Brezner; Flehr Hohbach Test Albritton & Herbert LLP

[57] ABSTRACT

A method for sterilizing fresh produce (e.g. onions) comprising contacting the produce with an aqueous solution of an oxidizing agent (e.g. hydrogen peroxide) under a pressure of at least 25 psig for sufficient time to significantly reduce the microbiological count.

9 Claims, No Drawings

PRODUCE STERILIZATION

BACKGROUND OF THE INVENTION

Oxidizing agents have been added to produce (fresh fruits and vegetables) for a variety of purposes. For example, in U.S. Pat. No. 5,085,880, hydrogen peroxide is added to a vegetable pulp to bleach it. Also, hydrogen peroxide has been used to decolorize and sterilize natural spices as disclosed in U.S. Pat. No. 2,615,813. The spices are significantly pretreated prior to the addition of an aqueous solution of hydrogen peroxide.

Also in a paper entitled Preservation of Intermediate Vegetable Products by Using Hydrogen Peroxide by L. I. Marchuk and S. M. Galkina (Ukrainian Scientific Research Institute of the Canning Industry), vegetables are peeled, washed, cut in halves or quarters and blanched with water. They are then minced on a chopper with steam heating to yield a product with a paste-like consistency followed by the addition of hydrogen peroxide. The article states that these intermediate vegetable products can be stored and canned.

In another article, entitled Effects of Hydrogen Peroxide Treatment on Fresh-Cut Fruits and Vegetables by G. M. Sapers, R. L. Miller and G. Simmons (IFT Annual Meeting: Book of Abstracts, 1995), a method is disclosed in which fruit and vegetables were exposed to hydrogen peroxide by the unpressurized injection of a vapor into a treatment chamber or immersion in 5 or 10% hydrogen peroxide solution×0.5–2 minutes.

There is a need for sterilize produce to microbial levels below that which can be achieved by the foregoing methods.

SUMMARY OF THE INVENTION

In the present invention, a method is provided for sterilizing fresh produce (fruits and vegetables) comprising contacting the produce with an aqueous solution of an oxidizing agent (e.g. hydrogen peroxide) under a pressure of at least 25 psig for sufficient time to significantly reduce the microbiological count of the produce. Suitable vegetables include onions, garlic, carrots, bell peppers, jalapenos, green chilies, spinach, celery, corn, cilantro, parsley, green peas, cauliflower, zucchini, potatoes, mushrooms, horseradish and red beets. The pressure can be applied by pressurized steam, air or water.

DETAILED DESCRIPTION OF PREFERRED EMBODIMENTS

The present application is directed to the treatment of produce (fresh fruits and vegetables) with a solution of oxidizing agent, preferably hydrogen peroxide, in an aqueous solution under pressure. The method is applicable to such treatment of a wide variety of vegetables such as onions, garlic, carrots, bell peppers, jalapenos, green chilies, spinach, celery, corn, cilantro, parsley, green peas, cauliflower, zucchini, potatoes, mushrooms, horseradish, red beets and to a variety of fruits including tomatoes, oranges, lemons, and blueberries.

The method has been most extensively tested with onions and so the present description will refer to the treatment of onion. Unless otherwise stated, the method is applicable to such other vegetables and to fruits. Also, the invention will first be described with respect to the use of hydrogen peroxide as the oxidizing agent.

In the present method, pressure is used to force the hydrogen peroxide into the root plate area and other surface areas such as tops and skins of the onion (or other produce) which are typically high in microbiological organisms. The pressure is set at a level which forces the hydrogen peroxide into the cracks, crevices, and surface layers on the outside of the onion but insufficient to destroy the cell walls of the onion. Since the cell walls are not substantially opened in the process, the hydrogen peroxide does not significantly oxidize the flavor components and so the natural flavor is retained even if the onion is subsequently dehydrated. During dehydration, large quantities of air move over the onion slices and continue to reduce any residual hydrogen peroxide into water and oxygen.

Thus, an important feature of the process is the application of pressure to accomplish the forcing of the hydrogen peroxide into the surface areas of the onion (produce). A batch or continuous process can be used. Preferably, the pressure is applied using steam or air pressure with the oxidizing agent in an aqueous solution.

Conventional preparation ("prepping") of onions prior to treatment with oxidizing agent includes (1) dry preparation to remove dirt, rocks, and other extraneous material; and (2) wet preparation which includes scrubbing and washing. The whole onion or selectively large pieces (e.g. as halves or quarters or thick slices or dices) may be used. Preferably, the onion, during prepping, is not reduced to a form such as a puree or thin slices. Purees can be treated to reduce microbial counts but such processing may rupture the cell walls to expose the flavor components to the hydrogen peroxide to the detriment of the flavor of the final product. Also, the onion (produce) preferably is treated with the hydrogen peroxide solution prior to subsequent heat processing. Heating can be used to enhance chemical activity but typically there is no steam blanching, cooking or dehydrating the onion prior to treatment. In fact, it is preferable that such heat treatments be avoided because of their potential adverse affect on flavor and color.

For hydrogen peroxide, suitable pressures can be as low as 25 psi to as high as 500 psi or more. A preferable range is 100 to 300 psi and more preferably from 150 to 250 psi.

The concentration of the hydrogen peroxide in the aqueous solution is selected to be sufficient to lower the microorganism count to the desired effect as set out below. Suitable concentrations are from about 0.1 to 50.0% and preferably from about 1 to 20%, and most preferably from about 1.0 to 3.0%. In general, a sufficient quantity of aqueous solution of the hydrogen peroxide is added to completely submerge the onions (produce) during application of the pressure.

The minimum retention time under pressure is that at which the microorganism count is sufficiently reduced for effective sterilization. A retention time as low as 5 seconds can accomplish this objective. Preferable retention times are at least about 30 to 60 seconds, to as high as 120 seconds or more.

The parameters of concentration and pressure are interrelated and so pressure at the lower end of the range could be used with a higher concentration. The best rests are achieved at high pressure and high concentration. Typically, appropriate conditions are economically dictated.

The use of pressure significantly improves the efficiency of reducing the microorganism count to safe levels. The microorganism count can be measured by the APC method, set forth in the FDA/BAM manual (reference 3.01–3.10, effective date, Mar. 16, 1998).

The amount of reduction in the microorganism count to a safe level depends on the count in the starting produce. The average reduction (e.g. for 45 samples) can be as little as about 0.25 logs to about 1.0 to 2.0 logs to about 3.0 logs or higher. As used herein, the term "sterilized produce" or "sterilized onion" will refer to the produce after completion of the above treatment.

The same pressures are used whether applied by steam, air or water pressure. Those skilled in the art will know how to apply pressures to an aqueous solution in a contained vessel. It is preferable, but not necessary, to agitate the onion in contact with the oxidizing solution to assist penetration of the oxidizing agent into the onion.

In one batch approach, an enclosed batch container is used which is rotated with whole onions and mixed with the hydrogen peroxide solution in sufficient amount to submerge the onions. The pressure is applied by injecting steam, air or water. Thereafter, excess solution is removed and the onions are ready for use or subsequent processing is set forth below.

In another batch operation, the prepped whole onions can be directed to a non-rotating batch vessel. Pressure is applied by injection of steam or air or by pressurized water. Again, the solution is removed.

In a third (continuous) process, the onions are directed to a surge hopper and continuously fed into a pressurized vessel via inlet and outlet airlocks. The other principles set forth above apply.

In one preferred continuous mode, the onion and oxidizing agent are fed to a pressure screw in which they are conveyed without heating.

In the above methods the product is subsequently dehydrated, e.g. to a moisture content of 4.0 to 5.5%. Any conventional form of dehydrated product can be used, including powder, slices, granules, and the like.

In a typical procedure, the sterilized onions or large pieces are first sliced, e.g. to suitable thickness followed by dehydration by conventional techniques. In one technique, dehydration is performed by forcing hot air through a bed of sliced onions in a Proctor dryer system.

The dehydrated slices can then be further accommodated as by milling to the size of a conventional dehydrated product powder for use as a flavoring agent.

The present invention has been described with respect to hydrogen peroxide as the oxidizing agent. However, aqueous solutions of other oxidizing agents may also be employed including ozone, sodium bromide, peracetic acid, chlorine dioxide, and sodium hypochlorite. Preferably these solutions of oxidizing agents are pressurized by air which is typically the most economic process that does not impact flavor or color. Certain preferred concentrations pressure ranges and retention times are set forth in the following Table 1.

TABLE 1

| Oxidizer | Concentration | Pressure Range | Retention Time |
| --- | --- | --- | --- |
| Hydrogen peroxide | 1 to 20% | 25 to 250 psi | 30 to 120 sec |
| Ozone | 1 to 10 ppm | 50 to 100 psi | 30 to 60 mins |
| Sodium bromide | 30 ppm | 100 to 200 psi | 60 sec |
| Peracetic acid | 80 to 160 ppm | 100 to 200 psi | 30 to 60 sec |
| Chlorine dioxide | 10 to 100 ppm | 20 to 200 | 30 to 60 sec |
| Sodium hypochlorite | 500 to 10,000 pmm | up to 200 psi | 5 to 60 sec |
| Sodium hydroxide | 1 to 20% | 25 to 250 psi | 30 to 120 sec |

The following examples illustrate various specific methods according to the present invention.

EXAMPLE 1

In this example, a batch method is performed using a K&K rotating steam peeler system. Whole onions are unloaded in a dry preparation area in which rocks, dirt, and extraneous material are removed. The onions are conveyed into wet preparation area in which they are washed and scrubbed.

Then the onions were conveyed to a K&K system. Utilizing level sensors, specific batch size were metered into a K&K hopper, in this case, 150 lbs/batch. When the selected hopper level was reached, the feed conveyor was stopped, the hopper slide gate opened and whole onions are dropped into K&K steam peeler vessel (vessel capacity, 100 liters). 75 lbs. of hydrogen peroxide solution at a 10% concentration was pumped into the vessel. The vessel door was closed and air pressure was applied to 200 psi, using Kaeser model SK19 air compressor. The rotation cycle was commenced for a 60 seconds retention time. When the cycle was completed the vessel was rotated to an upright position, the door opened, and the vessel rotates one complete turn to discharge onions and solution into the screw conveyor hopper. Spent solution was drained from the bottom of the screw conveyor and onions were conveyed to the slicer. Sliced onions were conveyed to a Proctor dryer and dehydrated to a finished moisture of 4.5 to 5.0%.

The treated aerobic plate count (APC) on 19 dry samples averaged 23,182 colony forming units (cfu). Untreated control onions were processed through the dry and wet prep areas only then sliced and dehydrated, APC average of 17 samples was 465,793 cfu.

EXAMPLE 2

In this example, a continuous method is performed using a continuous FMC steam screw peeler system. The whole onions are prepared as set forth in Example 1. The onions are conveyed to pressurized system. Screw conveyor controls rate of onions fed into system, approximately 85 lbs./min. Onions drop onto the first air lock door, 40 lbs/min of 10% hydrogen peroxide solution is simultaneously pumped onto onions. The door slides open and the onions fall onto second air lock door. The first door closes, second door opens, and the onions and solution drop into the pressurized screw conveyor system. Using an air compressor, pressure is maintained at 200 psi and screw conveyor speed adjusted to a 60 second retention time. At the discharge of the screw, onion drop onto first air lock door. The door is opened, onions fall onto the second air door, the first door closes, and then the second door opens. The spent solution drains from the bottom of the screw conveyor and onions are conveyed to the slicer. Sliced onions are conveyed to a Proctor dryer and dehydrated to a finished moisture of 4.5 to 5.0%.

What is claimed is:

1. A method for sterilizing fresh produce selected from the group consisting of onion and garlic comprising contacting said produce with an aqueous solution of an oxidizing agent comprising hydrogen peroxide, and maintaining said fresh produce and contacted hydrogen peroxide under a pressure of at least 25 psig for sufficient time to sterilize the produce by reducing its microbiological count.

2. The method of claim 1 in which the microbiological count is reduced by at least 0.25 log.

3. The method of claim 1 in which said hydrogen peroxide is present in said aqueous solution at a concentration of at least about 0.1%.

4. The method of claim 1 in which said produce is not heat treated prior to said contacting step.

5. The method of claim 1 in which said pressure is applied by pressurized steam, air or water.

6. The method of claim 1 in which said pressure is at least 100 psig.

7. The method of claim 1 in which said sterilized produce is subsequently dehydrated.

8. The method of claim 1 in which said pressure is at least 50 psi.

9. The method of claim 1 in which said fresh produce is maintained in contact with hydrogen peroxide for no greater than about one hour.

* * * * *

UNITED STATES PATENT AND TRADEMARK OFFICE
CERTIFICATE OF CORRECTION

PATENT NO.    : 6,045,846
DATED         : April 4, 2000
INVENTOR(S)   : Bautista et al.

It is certified that error appears in the above-identified patent and that said Letters Patent is hereby corrected as shown below:

<u>Title page,</u>
Item [73], Assignee: should read -- Basic Vegetable Products, L.P. --

Signed and Sealed this

Eighteenth Day of March, 2003

JAMES E. ROGAN
*Director of the United States Patent and Trademark Office*